United States Patent [19]

Nakayama

[11] Patent Number: 5,377,280

[45] Date of Patent: Dec. 27, 1994

[54] METHOD AND APPARATUS FOR AUTOMATIC LANGUAGE DETERMINATION OF EUROPEAN SCRIPT DOCUMENTS

[75] Inventor: Takehiro Nakayama, Sunnyvale, Calif.

[73] Assignees: Xerox Corporation, Stamford, Conn.; Fuji Xerox Corporation, Tokyo, Japan

[21] Appl. No.: 47,539

[22] Filed: Apr. 19, 1993

[51] Int. Cl.$^5$ .............................. G06K 9/46
[52] U.S. Cl. ................................ 382/17; 382/39; 382/61
[58] Field of Search ............. 382/30, 36, 39, 34, 382/61, 13, 9, 17, 18, 10; 364/419.01, 419.02, 419.03, 419.04

[56] References Cited

U.S. PATENT DOCUMENTS

| | | | |
|---|---|---|---|
| 3,988,715 | 10/1976 | Mullan et al. | 382/39 |
| 4,589,142 | 5/1986 | Bednar | 382/34 |
| 4,658,429 | 4/1987 | Orita et al. | 382/36 |
| 4,850,026 | 7/1989 | Jeng et al. | 382/30 |
| 5,034,989 | 7/1991 | Loh | 382/13 |
| 5,253,307 | 10/1993 | Wayner et al. | 382/22 |

Primary Examiner—Joseph Mancuso
Attorney, Agent, or Firm—Oliff & Berridge

[57] ABSTRACT

An automatic language-determining apparatus automatically determines the particular European language of the text image of a document when the gross-script-type is known to be, or is determined to be, an European script-type. A word token generating means generates word tokens from the text image. A feature determining means determines the frequency of appearance of word tokens of the text portion which correspond to predetermined word tokens. A language determining means converts the determined frequency of appearance rates to a point in a new coordinate space, then determines which predetermined region of the new coordinate space the point is closes to, to determine the language of the text portion.

8 Claims, 10 Drawing Sheets

| ENGLISH | | | | FRENCH | | | | GERMAN | | | |
|---|---|---|---|---|---|---|---|---|---|---|---|
| CORPUS | AAx | Ax | Aix | CORPUS | AAx | Ax | Aix | CORPUS | AAx | Ax | Aix |
| e1 | 8.63 | 3.87 | 0 | f1 | 0 | 15.8 | 0.07 | g1 | 0 | 0.34 | 7.47 |
| e2 | 6.02 | 4.78 | 0 | f2 | 0.10 | 11.0 | 0.20 | g2 | 0 | 1.15 | 7.00 |
| e3 | 7.83 | 3.36 | 0 | f3 | 0 | 13.3 | 0 | g3 | 0 | 1.00 | 6.89 |
| e4 | 9.31 | 3.33 | 0 | f4 | 0 | 14.2 | 0.10 | g4 | 0.24 | 0.48 | 6.67 |
| e5 | 9.72 | 3.05 | 0.10 | f5 | 0 | 15.0 | 0.10 | g5 | 0 | 0.56 | 6.57 |
| e6 | 8.96 | 3.83 | 0.09 | f6 | 0 | 14.9 | 0.10 | g6 | 0.12 | 1.00 | 6.59 |
| e7 | 8.62 | 3.00 | 0.13 | f7 | 0 | 15.9 | 0 | g7 | 0.16 | 1.13 | 5.65 |
| e8 | 9.39 | 2.88 | 0 | f8 | 0.32 | 17.0 | 0.11 | g8 | 0.25 | 0.86 | 4.80 |
| e9 | 7.84 | 4.94 | 0 | f9 | 0 | 18.6 | 0 | g9 | 0 | 1.08 | 5.77 |
| e10 | 6.74 | 4.93 | 0.10 | f10 | 0 | 15.5 | 0.19 | g10 | 0.11 | 0.77 | 5.93 |
| e11 | 6.78 | 3.77 | 0 | f11 | 0.11 | 13.4 | 0 | g11 | 0 | 2.62 | 5.64 |
| e12 | 9.10 | 3.70 | 0 | f12 | 0 | 14.1 | 0.40 | g12 | 0.11 | 1.45 | 6.02 |
| e13 | 6.57 | 3.94 | 0 | f13 | 0 | 13.0 | 0 | g13 | 0 | 1.45 | 5.21 |
| e14 | 8.98 | 4.30 | 0 | f14 | 0 | 11.7 | 0.23 | g14 | 0 | 0.46 | 4.75 |
| e15 | 6.65 | 3.33 | 0 | f15 | 0.20 | 14.7 | 0 | g15 | 0 | 1.97 | 6.80 |
| avg. | 8.08 | 3.80 | 0.04 | avg. | 0.05 | 14.5 | 0.10 | avg. | 0.07 | 1.09 | 6.12 |

| Character shape code | Members |
|---|---|
| A | ABCDEFGHIJKLMNOPQRSTUVWXYZbdfhkltß1234567890#$&()/<>[]@{}! |
| x | acemnorsuvwxz |
| i | iáàâãéèêíîóûù |
| g | gpqyç |
| j | j |
| ' | ' |
| ¡ | ~ |
| ˙ | ˙ |
| ·  | · |
| ¨ | :: |
| = | = |
| U | äëöüÖÜ |
| ! | ! |

FIG.3

| ENGLISH | | FRENCH | | GERMAN | |
|---|---|---|---|---|---|
| POPULATION | TOKEN | POPULATION | TOKEN | POPULATION | TOKEN |
| 953 | the | 5 | Ils | 8 | Als |
| 164 | The | | | | |
| 1 | (to | | | | |

FIG.5

| | V1 | V2 |
|---|---|---|
| AAx | 71.5400 | 97.2995 |
| Ax | 30.4168 | −50.4963 |
| Aix | −166.9777 | 24.3012 |

FIG.10

| ENGLISH | | FRENCH | | GERMAN | |
|---|---|---|---|---|---|
| POPULATION | TOKEN | POPULATION | TOKEN | POPULATION | TOKEN |
| 383 | to | 963 | de | 50 | Im |
| 54 | be | 484 | la | 31 | In |
| 50 | In | 190 | le | 13 | Da |
| 16 | As | 164 | du | 12 | da |
| 10 | On | 70 | En | 8 | So |
| 4 | To | 67 | La | 4 | Es |
| 3 | An | 36 | Le | 2 | Am |
| 2 | No | 16 | De | 1 | Zu |
| 1 | La | 14 | Au | 1 | La |
| 1 | We | 5 | Vu | 1 | An |
| | | 4 | Un | | |
| | | 4 | Ce | | |
| | | 3 | Eu | | |
| | | 3 | Du | | |
| | | 2 | On | | |

FIG.6

| ENGLISH | | FRENCH | | GERMAN | |
|---|---|---|---|---|---|
| POPULATION | TOKEN | POPULATION | TOKEN | POPULATION | TOKEN |
| 2 | (in | 10 | fin | 417 | die |
| 1 | lie | 4 | dix | 168 | Die |
| 1 | fix | | | 22 | bis |
| | | | | 6 | Ein |
| | | | | 5 | Mio |
| | | | | 3 | Sie |
| | | | | 1 | hin |
| | | | | 1 | Wie |

FIG.7

| | ENGLISH | | | | FRENCH | | | | GERMAN | | |
|---|---|---|---|---|---|---|---|---|---|---|---|
| CORPUS | AAx | Ax | Aix | CORPUS | AAx | Ax | Aix | CORPUS | AAx | Ax | Aix |
| e1 | 8.63 | 3.87 | 0 | f1 | 0 | 15.8 | 0.07 | g1 | 0 | 0.34 | 7.47 |
| e2 | 6.02 | 4.78 | 0 | f2 | 0.10 | 11.0 | 0.20 | g2 | 0 | 1.15 | 7.00 |
| e3 | 7.83 | 3.36 | 0 | f3 | 0 | 13.3 | 0 | g3 | 0 | 1.00 | 6.89 |
| e4 | 9.31 | 3.33 | 0 | f4 | 0 | 14.2 | 0.10 | g4 | 0.24 | 0.48 | 6.67 |
| e5 | 9.72 | 3.05 | 0.10 | f5 | 0 | 15.0 | 0.10 | g5 | 0 | 0.56 | 6.57 |
| e6 | 8.96 | 3.83 | 0.09 | f6 | 0 | 14.9 | 0.10 | g6 | 0.12 | 1.00 | 6.59 |
| e7 | 8.62 | 3.00 | 0.13 | f7 | 0 | 15.9 | 0 | g7 | 0.16 | 1.13 | 5.65 |
| e8 | 9.39 | 2.88 | 0 | f8 | 0.32 | 17.0 | 0.11 | g8 | 0.25 | 0.86 | 4.80 |
| e9 | 7.84 | 4.94 | 0.10 | f9 | 0 | 18.6 | 0 | g9 | 0 | 1.08 | 5.77 |
| e10 | 6.74 | 4.93 | 0 | f10 | 0 | 15.5 | 0.19 | g10 | 0.11 | 0.77 | 5.93 |
| e11 | 6.78 | 3.77 | 0 | f11 | 0.11 | 13.4 | 0 | g11 | 0 | 2.62 | 5.64 |
| e12 | 9.10 | 3.70 | 0 | f12 | 0 | 14.1 | 0.40 | g12 | 0.11 | 1.45 | 6.02 |
| e13 | 6.57 | 3.94 | 0 | f13 | 0 | 13.0 | 0 | g13 | 0 | 1.45 | 5.21 |
| e14 | 8.98 | 4.30 | 0 | f14 | 0 | 11.7 | 0.23 | g14 | 0 | 0.46 | 4.75 |
| e15 | 6.65 | 3.33 | 0 | f15 | 0.20 | 14.7 | 0 | g15 | 0 | 1.97 | 6.80 |
| avg. | 8.08 | 3.80 | 0.04 | avg. | 0.05 | 14.5 | 0.10 | avg. | 0.07 | 1.09 | 6.12 |

FIG.8

METHOD AND APPARATUS FOR AUTOMATIC LANGUAGE DETERMINATION OF EUROPEAN SCRIPT DOCUMENTS

BACKGROUND OF THE INVENTION

1. Field of the Invention

The present invention relates to a method and apparatus for automatic document recognition and, more particularly, to a method for automatically determining the language(s) of the document.

2. Description of Related Art

Optical character recognition and the use of optical character recognition to convert scanned image data into text data suitable for use in a digital computer is well known. In addition, methods for converting scanned image data into text data and the types of errors such methods generate are well known. However, the selection of a proper method for error correction is highly dependent upon the language of the document. Conventionally, the methods for optical character recognition and for error correction in optical character recognition systems have been provided on the assumption that the language used in the document is known in advance or assumed to be in the language of the country in which the system is being used. That is, in the United States, conventional optical character recognition systems would assume that the document is in English. Alternately, an optical character recognition system can be implemented with the character recognition and error resolution methods for a plurality of languages.

However, it has heretofore not been possible to have the optical character recognition system automatically determine the language of the document. Rather, as each document is provided to the optical character recognition system, some indication of the particular language of the document must be provided to the optical character recognition system. This has been accomplished by either having the operator input data concerning the language of the document to the optical character recognition system, or by having the document provided with special markings which indicate the language of the document.

SUMMARY OF THE INVENTION

It is therefore an object of the present invention to provide an optical character recognition system having automated language recognition capabilities.

It is also an object of the present invention to provide an apparatus and method for automatically determining the language of a document.

It is another object of the present invention to automatically determine the language of a European script-type document.

It is yet another object of the present invention to automatically determine the language of a European script-type document based on the frequency of appearance of tokens in the document.

According to a first preferred embodiment of the present invention, a text portion of an image of a document, after identification and conversion of the characters of the text portion to tokens in an abstract character code, is searched for tokens corresponding to one or more preselected tokens. The frequency of appearance of the preselected tokens in the document is determined and then converted, using linear discriminant analysis (LDA) or another known classification technique, to a new coordinate space. The new coordinate space has previously been divided into two or more regions, corresponding to one or more European languages. The new coordinate space is divided into the two or more regions based on the frequency of appearance of the preselected tokens in generalized text portions in the corresponding one or more European languages.

In the first preferred embodiment of the method of the present invention, the one or more corresponding European language are English, French and German and the preselected tokens are "AAx", "Aix" and "Ax". In the first preferred embodiment of the apparatus of the present invention, the automatic language recognition apparatus comprises an input means for inputting a text portion, a token generating means for converting the text portion into tokens; a feature determining means for determining the number of appearances of tokens in the text portion corresponding to one or more preselected tokens; and language determining means for determining the appearance frequencies of tokens corresponding to the preselected tokens and converting the determined appearance frequencies to a first point in a new coordinate space and for determining the language of the text portion based on the location of the first point relative to one or more regions in the new coordinate space.

In a second preferred embodiment, the automatic language recognition apparatus further comprises a scanner for scanning the document, input means for inputting a text portion from the image of the document, connected component generating means for generating connected components from portions of the text portion; spatial feature determining means for determining the lines, words, and character cells within the text portion; character classification means for converting the connected components within the character cells into abstract character codes; and means for grouping the abstract character codes into tokens.

BRIEF DESCRIPTION OF THE DRAWINGS

The invention is described in relation to the accompanying drawings, in which:

FIG. 3 shows an abstract character code chart;

FIG. 5 shows a first token pattern chart;

FIG. 6 shows a second token pattern chart;

FIG. 7 shows a third token pattern chart;

FIG. 8 shows a combined token frequency chart;

FIG. 10 shows the LDA variables; and

DETAILED DESCRIPTION OF THE PREFERRED EMBODIMENTS

Figure 1:
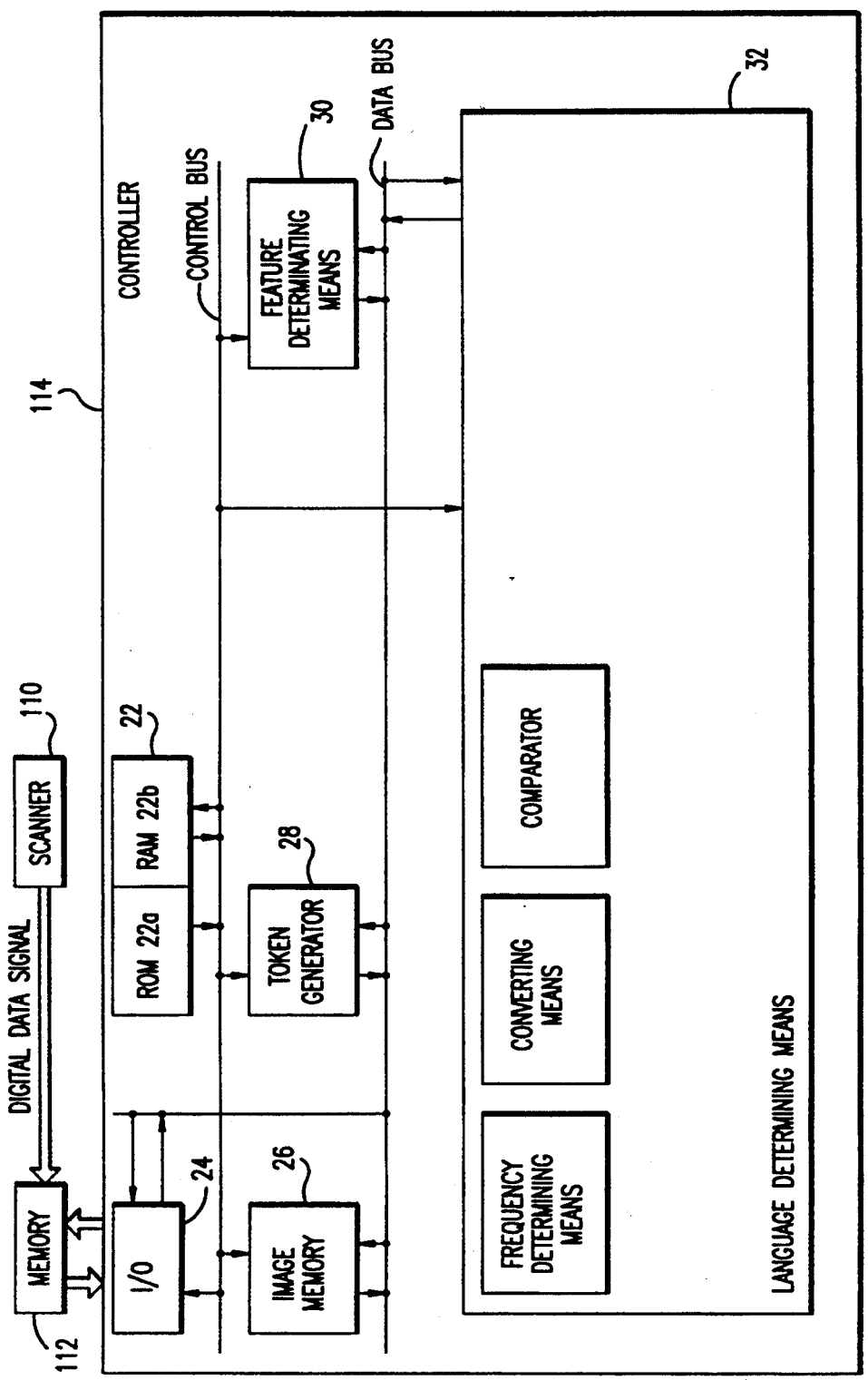
FIG. 1 shows a block diagram of an optical character recognition system.
Figure 2:
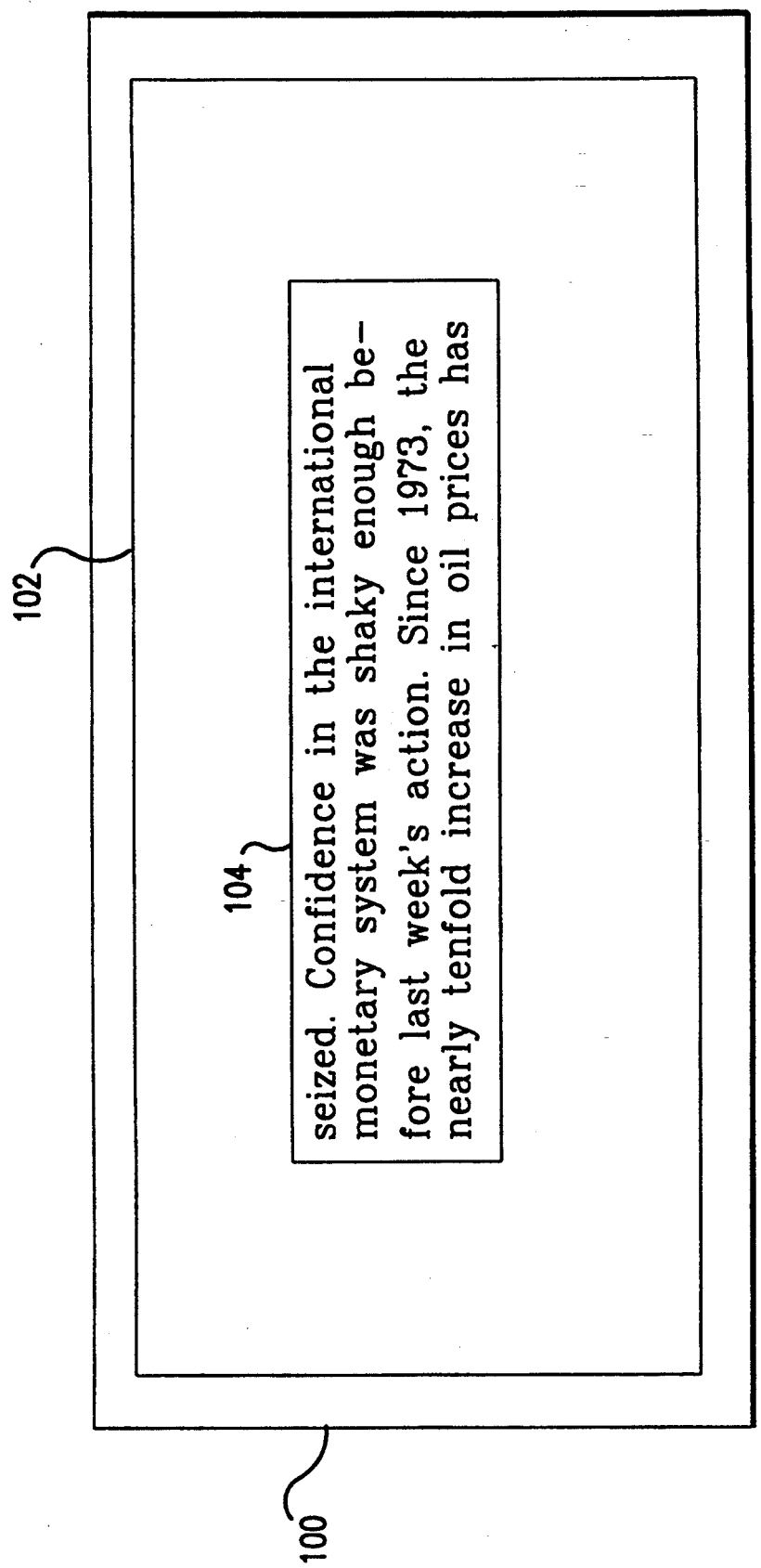
FIG. 2 shows a document having three sample text portions, one in each of English, French, and German.

As shown in FIG. 1, the optical character recognition system of the present invention comprises a scanner 110 having a charge coupled device (CCD) or the like. The scanner 110 scans a document 100 having an image 102, the image 102 comprising, for example, three European script-type text strings of an unknown European language, as shown in FIG. 2, and outputs a digital data signal representative of the location and image density of a plurality of pixels comprising the image 102 of the original document 100. This digital data signal is sent to a memory 112, where it is stored temporarily or indefinitely. The digital data signal, when output from the memory 112, is input to a general purpose digital computer 114. Once input to computer 114, the digital data signal is first cleaned up by removing any non-text portions of the image 102, leaving a text portion 104. Further, any scanner artifacts or the digital data signal, such as skew or the like, are corrected for. The cleaned up digital data signal is then restored to the memory 112 or stored in a memory of the computer 114. Alternatively, the scanner can provide some of the preprocessing, such as removal of scanner artifacts.

As shown in FIG. 1, the general purpose digital computer 114 of the present invention comprises a memory 22 for storing a control program, an input/output circuit 24 for inputting the digital data signal from the memory 112 and for outputting a signal representative of the determined language of the document 100. In a first preferred embodiment of the present invention, the document is assumed to be in a European script-type. In this case, the general purpose computer 114 also comprises an image memory 26 for storing the digital data signal, a token generating means 28 for converting the data signal into a plurality of tokens, feature determining means 30 for determining the number of appearances of one or more predetermined tokens in the text portion 104; and a language determining means 32 for determining the language of the document. The memory 22 for storing the control program may comprise either a ROM 22a or a RAM 22b. However, should it be necessary to first determine if the text portion is in a European script-type, the general purpose computer 114 can be provided with a script determining means 38. A preferred embodiment of the script determining means 38 is described in U.S. Application Ser. No. 08/047,515, filed Apr. 19, 1993 assigned to the same assignee as the present invention and incorporated herein by reference.

In operation, the document 100 containing the image 102, as shown in FIG. 1, is placed into and scanned by the scanner 110 to generate a serial or parallel digital data signal. The digital data signal comprises a plurality of signal portions, each portion representative of a corresponding pixel of the original image 102. Each pixel of the image 102 has a location in the image 102 and an image density. Accordingly, each signal portion of the digital data signal includes data representative of the location and image density of the corresponding pixel.

The digital data signal output by the scanner 110 is then stored in the memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the image 102.

Once the operator has completed inputting documents into the scanner 110 or the system otherwise determines that the digital data signal representative of the image 102 should be converted to text data, the digital data signal representative of the image 102 is output from the memory 112 to the general purpose computer 114. It is of course understood that a special purpose digital computer or hardwired logic circuit can be used in place of the general purpose digital computer 114.

Figure 4:
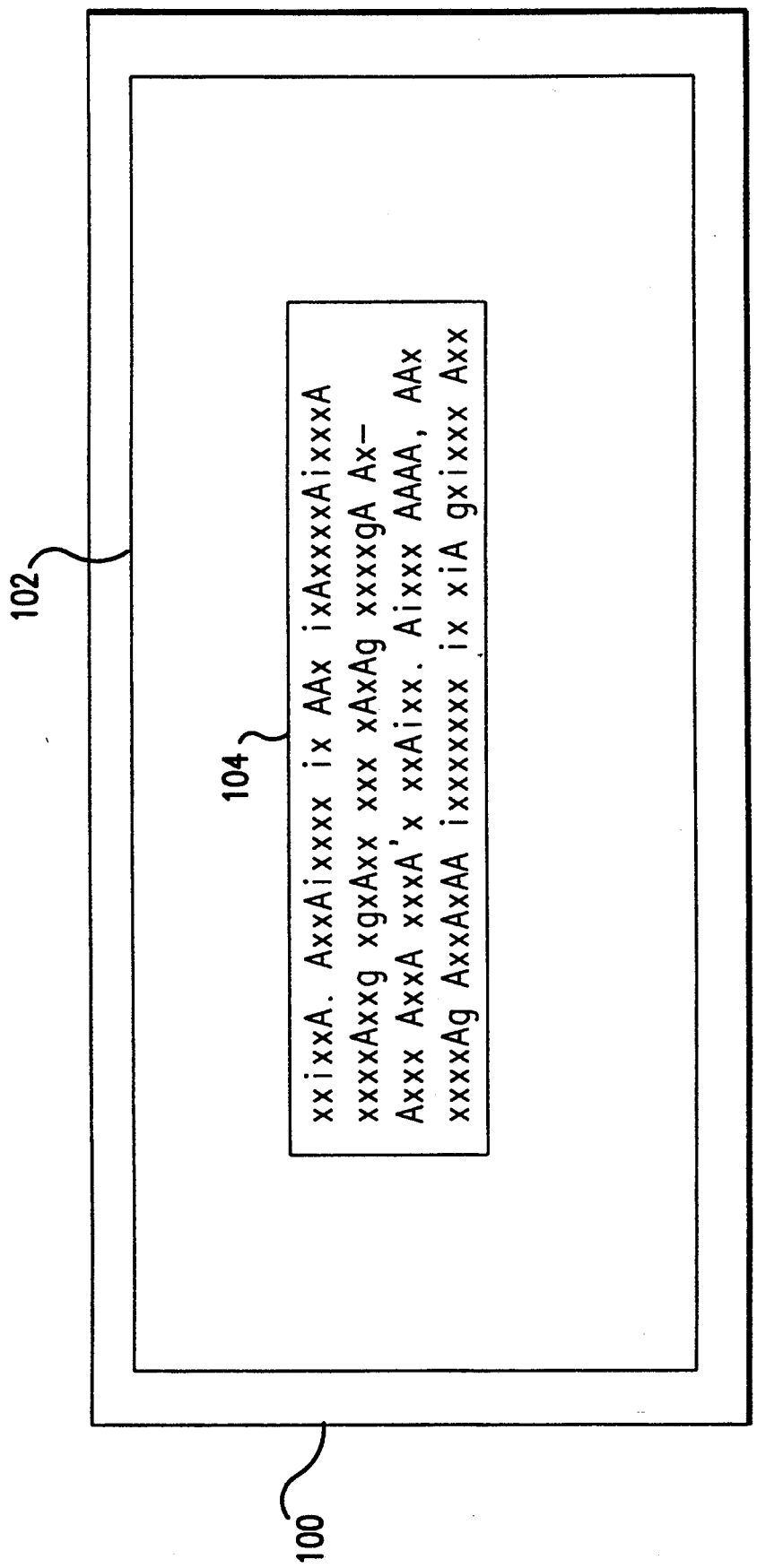
FIG. 4 shows the text portion of FIG. 2 converted to the abstract character codes shown in FIG. 3.

The digital image data signal stored in the memory 112 is output to the general purpose computer 114, where it is input through the input/output means 24 to an image memory 26. Once the digital data signal has been completely stored in the image memory 26, the digital data signal is then made available to the token generating means 28. The token generating means 28 converts the digital data signal representative of the image 102 into a plurality of tokens. Each token comprising one or more abstract character codes. A method and apparatus for generating tokens from a text portion 104 of an image 102 of a document 100, is described in U.S. Application Ser. No. 08/047,540, filed Apr. 19, 1993, assigned to the same assignee as the present application, and is incorporated herein by reference. FIG. 3 shows a preferred coding scheme for converting characters of the text portion 104 to abstract character codes. FIG. 4 shows, the text portion 104 of FIG. 2 after conversion using the coding scheme shown in FIG. 3.

It is of course understood that the coding scheme of FIG. 3 could also be used to convert a text document of unknown language input to the general purpose digital computer as a digital data signal from an independent device. In this case, the digital data signal is representative of the characters of the text document rather than pixels of a text portion 104. Thus, the token generating means 28 directly converts the characters of the text document to tokens of the abstract character code.

Once the token generating means 28 generates the plurality of tokens, the list of tokens generated by the token generating means 28 is output to the feature determining means 30.

Because the method and apparatus of the present invention are statistically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component character into two or more connected components, merging two or more separate connected components into a single connected component or misplacing the connected components on the line.

FIGS. 5-7 each shows a token and the various words corresponding to the token occurring in the languages of english, French and German. FIGS. 5-7 also show the number of times these words occurs in 45 sample documents, 15 each in English, French and German. The 15 documents in each language are translations of the same 15 base documents. FIG. 5 clearly shows that the character token "AAx" token appears very much more often in the 15 English documents than in either the 15 French or 15 German documents. The "AAx" token appears a total of 1118 times in the 15 English documents, 5 times in the 15 French documents and 8 times in the 15 German documents for an English:-French:German ratio of 224:1:1.6:, or 224 times more often in English than in French and 140 times more often than in German.

Likewise, FIG. 6 clearly shows that the character token "Ax" appears very much more often in the 15 French documents than in either the 15 English or 15 German documents. The "Ax" token appears a total of 2025 times in the 15 French documents, 524 times in the 15 English documents, and 123 times in the 15 German documents, for an English:French:German ratio of 16.5:4.3:1, or 3.86 times more often in French than English and 16.5 times more often in French than German.

Further, FIG. 7 clearly shows that the "Aix" token appears very much more often in the 15 German documents than in either the 15 English or 15 French documents. The "Aix" token appears a total of 593 times in the 15 German documents, 4 times in the 15 English documents, and 14 times in the 15 French documents, for an English:French:German ratio of 1:3.5:148, or 148 times more often in German than English and 50.3 times more often in German than French.

FIG. 8 shows the token appearance ratio for the three tokens "AAx", "Ax" and "Aix" for each of the 15 English, 15 French and 15 German documents, normalized to the length of the particular document. As FIG. 18 clearly shows, the "Aix" token rarely appears in English, while the "AAx" token appears twice to three times as often as the "Ax" token. Similarly, the "AAx" and "Aix" tokens rarely appear in French, while the "Ax" token comprises between 10 and 20 percent of all words in the 15 French documents. This rate of occurrence is better than twice the occurrence rates of the "AAx" than in English and the "Aix" token in German. Further, the "AAx" token rarely appears in German, while the "Aix" token appears 2 to 22 times more often than the "Ax" token.

Figure 9:
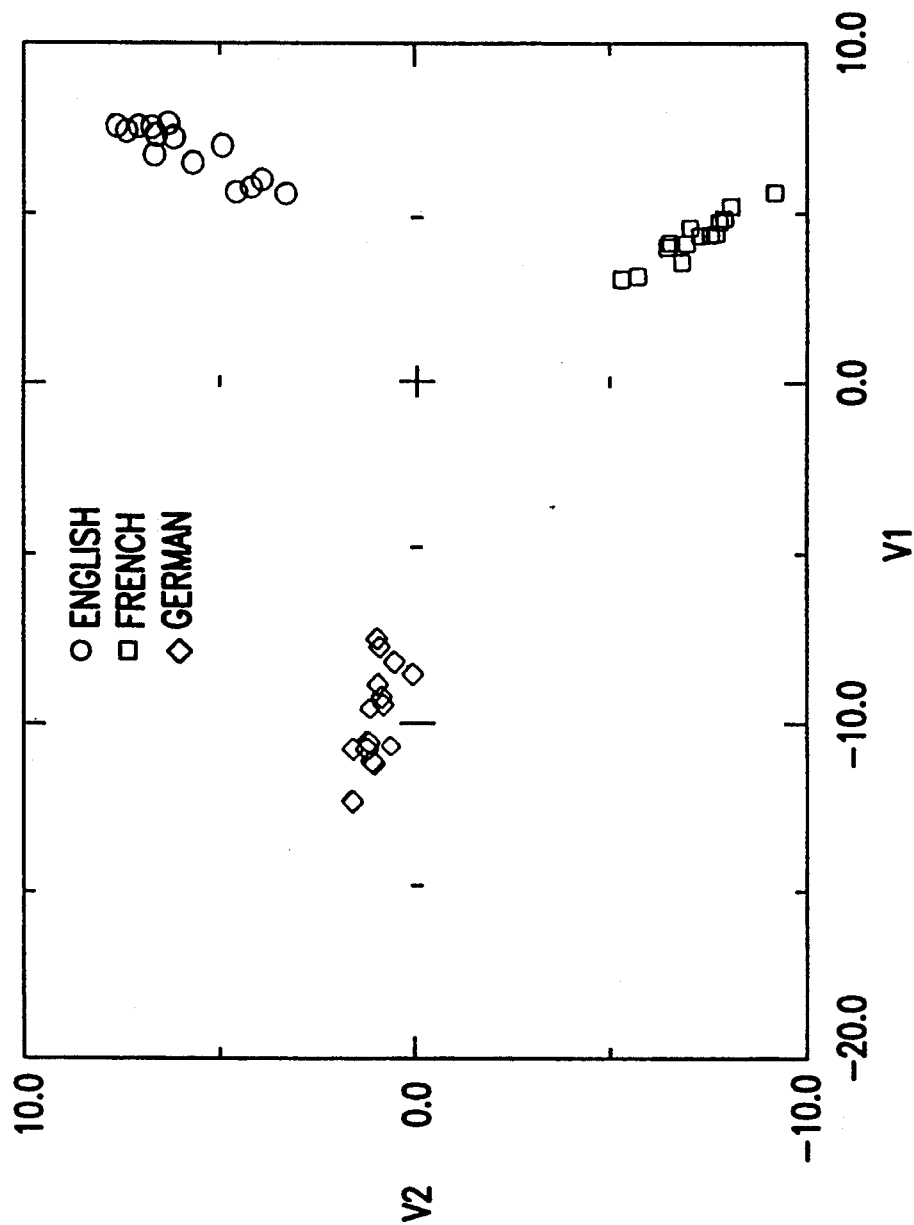
FIG. 9 shows a Linear Discriminant Analysis distribution of FIG. 8.

The feature determining means 30 determines the number of appearances of the "AAx", "Ax" and "Aix" tokens, or any other predetermined tokens in the text portion 104, and the total number of words in the text portion 104. It is of course understood that these tokens are specific to distinguishing between English, French and German and are based on the similarities and differences in the frequency of occurrence of these token in these languages. That is, if the possible languages of the document are English, Spanish and Italian, the predetermined tokens might not be (and probably would not be) the "AAx", "Ax" and "Aix" tokens. This information is output by the feature determining means 30 to the language determining means 32, which converts the number of appearances and number of words to appearance rates, then converts the appearance rates to a new coordinate space using linear discriminate analysis (LDA). FIG. 9 shows the LDA space plot of the appearance rates of the 45 sample documents. The LDA conversion allows the appearance rates to be plotted in a coordinate space having equal variance and uncorrelated variables. FIG. 10 shows the LDA discriminant variable values for new variables V1 and V2 for each token "AAx", "Ax" and "Aix". By multiplying and then summing the appearance rates for the three tokens of the text portion by the V1 and V2 variable values, the appearance rates of the text portion are converted to a single point in the new coordinate space, as shown in FIG. 9. As FIG. 9 clearly shows, the appearance rates for the 15 English documents plot to a region of the new coordinate space which is widely separated from the regions to which the appearance rates of either the 15 French or the 15 German documents plot. Likewise, the appearance rates for the 15 French documents plot to a region widely separated from the region to which the appearance rates of the 15 German documents plot.

After the language determining means 32 converts the appearance rates of the text portion to a point in the LDA space, it compares the location of the point in LDA space to the centroid of each of the 15 English documents, the 15 French and 15 German documents. Depending on which region's centroid is determined to be closest to the location of the point of the text portion in LDA space, the corresponding language is output by the language determining means 32 as the language of the text portion.

The general purpose computer 114 then outputs at least the determined language of the text portion to the optical character recognition system for converting the text portion into a text document. Alternatively, when the original input to the general purpose computer 114 is a text document instead of a text portion of a scanned document, the general purpose computer 114 outputs a signal indicating the determined language to either the device which originally output the text portion to the general purpose computer 114 or some third device. Further, if the optical character recognition system is implemented by the general purpose computer 114, the above signals are not output. Rather, they are merely made available to the OCR system within the general purpose digital computer 114.

Figure 11:
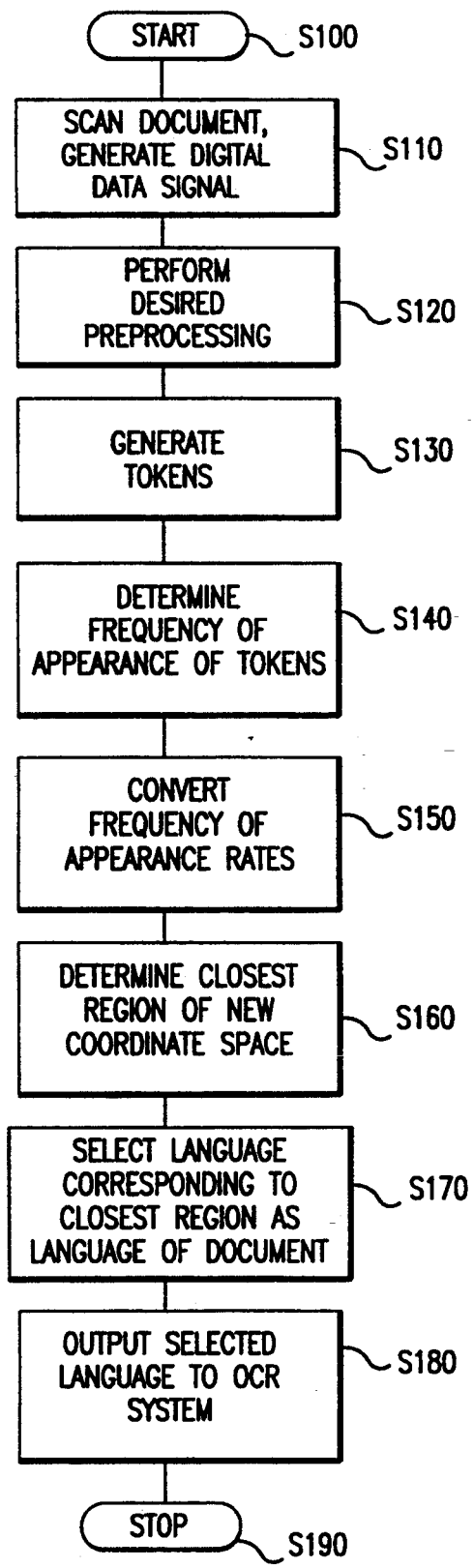
FIG. 11 shows a simplified flow chart.

A simplified flowchart of the operation of the script determining system set forth above is shown in FIG. 11. In step S100, the system starts, and the document is scanned in step S110 to generate the digital data signal. The digital image data signal is then cleaned-up by applying any desired preprocessing algorithms to the digital image data signal in step S120. In steps 130, the tokens are generated and in step S140, the frequency of appearance in the text portion for each predetermined token is determined. In step S150, the frequency of appearance rates are converted, using linear discriminate analysis, to a portion the new coordinate space. In step S160, the predetermined region to which the point is closest is determined, and in step S170, the language corresponding to the closest predetermined region in the new coordinate space is determined to be the language of the text portion 104 (or the text document). Then, the determined language is output in step S180. Finally, in step S190 the system steps.

While the invention has been described with reference to particular preferred embodiments, the invention is not limited to the specific examples given, and other embodiments and modifications can be made by those skilled in the art without the departing from spirit and scope of the invention and claims.

What is claimed is:

1. An automatic language determining apparatus for determining a language of a text portion of document having a known script-type, comprising:
   input means for inputting a digital data signal representative of the text portion of the document, the text portion being in an unknown language;
   word token generating means for converting the digital data signal to a plurality of word tokens, each word token comprising at least one of a limited number of abstract-coded character classes, each abstract-coded character class representing a group of characters of the known script-type;
   feature determining means for determining at least one word token occurrence value of word tokens occurring within the plurality of word tokens and corresponding to at least one predetermined word token; and language determining means for determining the language of the text portion of the document based on the at least one word token occurrence value.

2. The automatic language determining means of claim 1, wherein the at least one predetermined word token comprises at least one abstract-coded character class and is selected from a set of word tokens comprising at least the word tokens "AAx", "Ax" and "Aix".

3. An automatic language determining apparatus for determining a language of a text portion of a document having a known script-type, comprising:

input means for inputting a digital data signal representative of the text portion of the document, the text portion being in an unknown language;

word token generating means for converting the digital data signal to a plurality of word tokens, each word token comprising at least one of a limited number of abstract-coded character classes, each abstract-coded character class representing a group of characters of the known script-type of the document;

feature determining means for determining at least one word token occurrence value of word tokens occurring within the plurality of word tokens and corresponding to at least one predetermined word token; and language determining means for determining the language of the document based on the at least one word token occurrence value, said language determining means comprising:

means for determining frequency-of-occurrence-rates for word tokens within the text portion for each at least one predetermined word token from the word token occurrence value;

means for converting the determined frequency rates to a point in a coordinate space; and means for determining a closest one of a plurality of predetermined regions within the coordinate space to the point, each predetermined region having a corresponding language, the language corresponding to the closest region being determined as the language of the text portion.

4. The automatic language determining apparatus of claim 3, wherein each predetermined region corresponds to a different one of a plurality of languages.

5. The automatic language determining apparatus of claim 4, wherein the plurality of languages comprise English, French and German.

6. A method for automatically determining a language of a European script-type document, comprising the steps of:

converting characters of a text portion of the document to word tokens of an abstract character code to form a converted text portion;

determining for each of at least one predetermined word token, a number of occurrences of each predetermined word token within the converted text portion;

determining a frequency of occurrence rate for each at least one predetermined word tokens within the converted text portion;

converting the frequency of occurrence rates to a point in a coordinate space; and determining the language of the text portion based on the location of the text point in the coordinate space.

7. The method of automatic language determination of claim 6, wherein the language determining step comprises the steps of:

dividing the coordinate space into at least one predetermined region, each predetermined region having a corresponding language, determining which at least one predetermined region is closest to the point; and selecting the corresponding language of the closest predetermined region as the language of the text portion.

8. The method of claim 7, wherein each predetermined region comprises a plurality of points, each of the plurality of points corresponding to a document in the corresponding language, and wherein the step of determining the closest predetermined region comprises the steps of:

determining a centroid of each predetermined region based on locations of the plurality of points;

determining, for each predetermined region, a centroid distance between the point and the centroid; and selecting the predetermined region having a smallest centroid distance as the closest predetermined region.

* * * * *